(No Model.)

A. C. CARPENTER.
TRUCK.

No. 281,017. Patented July 10, 1883.

Witnesses.
Robert Everett
J. A. Rutherford

Inventor.
Alexis C. Carpenter.
By James L. Norris
Atty.

UNITED STATES PATENT OFFICE.

ALEXIS C. CARPENTER, OF ROCHESTER, NEW YORK.

TRUCK.

SPECIFICATION forming part of Letters Patent No. 281,017, dated July 10, 1883.

Application filed May 3, 1883. (No model.)

*To all whom it may concern:*

Be it known that I, ALEXIS C. CARPENTER, a citizen of the United States, residing at Rochester, New York, have invented new and useful Improvements in Trucks, of which the following is a specification.

This invention relates to that class of trucks which consist of a low bed or platform mounted on wheels or rollers, and designed for transporting or moving heavy packages, goods, stones, safes, &c.

The object of the invention is to provide a truck of the class specified which can be run with ease and facility in curved as well as straight paths, and is also specially adapted for turning corners, these being properties not possessed by the trucks heretofore devised.

To these ends the invention consists in a truck having front and rear rollers or wheels of equal size or diameter, and provided with a central roller which is made tapering from its center to its ends, so as to present the shape of two frustums of cones, with their bases or largest ends placed together.

Figure 1:
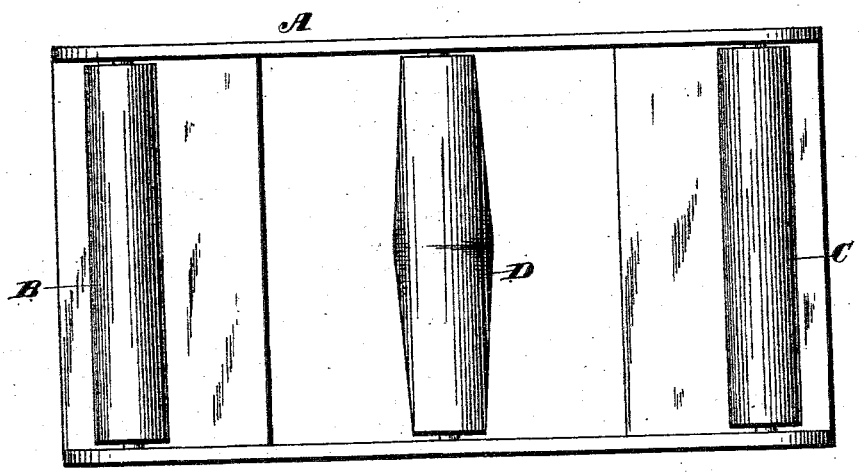
Figure 2:
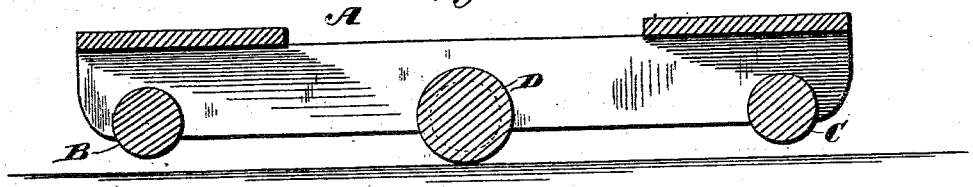
Figure 3:
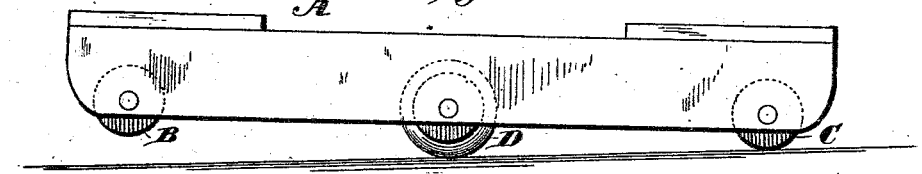

In the drawings, Figure 1 is a bottom view of a truck constructed according to my invention. Fig. 2 is a longitudinal section of the same. Fig. 3 is a side elevation, showing one of the end rollers and the middle portion of the center roller in contact with the ground or floor.

The letter A designates a platform or truck which has bearings at its front and rear ends for the reception of transverse rollers B C. These rollers are made perfectly cylindrical throughout their entire lengths. At the center of the truck frame or bed is located a roller, D, which is made in the shape of two frustums of cones, having their bases or largest portions brought together, so as to be in line with the center of the truck. In other words, the roller D is largest at its middle, and gradually decreases in diameter toward the sides of the truck frame or bed. The smallest diameter, however, of the roller D exceeds the diameter of either of the rollers B C, and hence it will be manifest that when the truck is traveling or running in a straight path it will be supported on one of its end rollers and the middle or largest portion of its center roller.

When it is desired to run the truck in a curved path, the truck is tipped at either side, so as to cause it to be supported upon one of the frustums of cones, or one-half of the center roller, D, and the end roller which may happen to be lowermost or resting upon the ground. Then, by turning the truck, it follows that the cone-shaped roller will cause it to swing around and describe a curved path until the truck is again raised to bring the middle portion of the center roller into such position that it alone constitutes the supporting-surface, in connection with one of the end rollers. It will be understood that when the truck is running in a straight path it is tipped at either end, so as to cause one of its end rollers and the middle portion of the center roller to form supporting or rolling surfaces, and that when the truck is to travel in a curved path it is depressed at either side to cause one of the frustums constituting the center roller to roll upon the ground. This being the case, it follows that by reason of the tapering rolling surface the forward propulsion of the truck will continue in a curved path until the truck again assumes its normal position. When, however, it is desired to turn the truck completely around, it is brought into a perfectly horizontal plane, when the middle portion of the center roller alone becomes the bearing or supporting surface, and constitutes a pivot on which the truck can turn.

I desire it to be understood that while I have shown my invention adapted to a low platform-truck having front and rear transverse rollers, I may provide any known form of truck with a central biconical roller, and support the ends upon wheels or rollers, as may be found most expedient.

I am aware that a four-wheeled warehouse-truck has been provided with a pair of wheels placed centrally between the ordinary wheels, and either made of greater diameter or so placed that the periphery of such additional wheels will project below the ordinary wheels for forming a central bearing for the truck on which it can turn as on a central pivot. This construction is only designed to facilitate the turning of corners, and does not involve the use of rolling surfaces, which cause the truck to travel in a curved line or path without the assistance of any material force to swing the truck around.

Having thus described my invention, what I claim is—

A truck having a transverse center roller made tapering from its middle to its ends, or composed of two frustums of cones with their bases placed together, and provided with ordinary front and rear wheels or rollers, substantially as described.

In testimony whereof I have hereunto set my hand in the presence of two subscribing witnesses.

ALEXIS C. CARPENTER.

Witnesses:
J. B. WAIGHT,
J. H. ROBES.